United States Patent
Chen et al.

(10) Patent No.: US 8,750,323 B2
(45) Date of Patent: Jun. 10, 2014

(54) METHOD FOR SWITCHING DATA AND STRUCTURE FOR SWITCHING DATA

(75) Inventors: Wumao Chen, Shenzhen (CN); Dajun Zang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 13/348,106

(22) Filed: Jan. 11, 2012

(65) Prior Publication Data

US 2012/0106564 A1 May 3, 2012

Related U.S. Application Data

(63) Continuation of application No. PCT/CN2010/073246, filed on May 26, 2010.

(30) Foreign Application Priority Data

Jul. 14, 2009 (CN) .......................... 2009 1 0108752

(51) Int. Cl.
*H04L 12/28* (2006.01)
*H04L 12/56* (2006.01)

(52) U.S. Cl.
CPC .................................. *H04L 49/3045* (2013.01)
USPC ......................................................... 370/413

(58) Field of Classification Search
CPC .................. H04L 12/5693; H04L 2012/5679; H04L 49/3045; H04L 47/10; H04L 49/101; H04L 49/90; H04L 47/50; H04L 49/70
USPC .............. 370/229, 230, 235, 235.1, 291, 292, 370/335, 369, 370, 380, 389, 400, 412, 413, 370/423, 427; 709/238; 379/91.02, 93.09, 379/93.14, 100.15, 165, 335, 291, 292, 306

See application file for complete search history.

(56) References Cited

U.S. PATENT DOCUMENTS

2003/0063618 A1    4/2003   Khacherian et al.
2003/0227932 A1    12/2003  Meempat et al.
(Continued)

FOREIGN PATENT DOCUMENTS

CN      1411211 A      4/2003
CN      1452351 A      10/2003

OTHER PUBLICATIONS

Extended European Search Report dated Apr. 25, 2012 in connection with European Patent Application No. 10799396.6, 5 pages.

(Continued)

*Primary Examiner* — Paul H. Masur
*Assistant Examiner* — Michael Phillips

(57) ABSTRACT

A method and structure for switching data is provided. An output port scheduler obtains state information of VOQs and available state information of input port data channels and output port buffers. The output port scheduler sends scheduling request information to a FIC of an input port whose input port data channel is ready in input ports corresponding to non-empty VOQs pointing to an output port. After receiving the scheduling request information sent by the output port schedulers, the FIC of the selected input port selects to respond to a scheduling request of one output port scheduler, and sends the VOQ pointing to the output port in the selected input port to the output port buffer. The output port scheduler schedules the VOQ received by the output port buffer out of a switch chip. Buffer resources are saved and the switching performance is improved.

15 Claims, 7 Drawing Sheets

(56) References Cited

U.S. PATENT DOCUMENTS

| | | |
|---|---|---|
| 2004/0081184 A1* | 4/2004 | Magill et al. .................. 370/413 |
| 2004/0260829 A1* | 12/2004 | Husak et al. .................. 709/232 |
| 2008/0175259 A1* | 7/2008 | Chao et al. .................... 370/413 |
| 2009/0175287 A1 | 7/2009 | Kamiya |
| 2012/0236849 A9* | 9/2012 | Szymanski .................. 370/355 |

OTHER PUBLICATIONS

Written Opinion of the International Searching Authority dated Sep. 9, 2010 in connection with International Patent Application PCT/CN2010/073246, 3 pages.

International Search Report dated Sep. 9, 2010 in connection with International Patent Application No. PCT/CN2010/073246.

* cited by examiner

METHOD FOR SWITCHING DATA AND STRUCTURE FOR SWITCHING DATA

CROSS-REFERENCE TO RELATED APPLICATIONS

This application is a continuation of International Application No. PCT/CN2010/073246, filed on May 26, 2010, which claims priority to Chinese Patent Application No. 200910108752.9, filed on Jul. 14, 2009, both of which are hereby incorporated by reference in their entireties.

TECHNICAL FIELD

The present invention relates to the field of communications, and in particular, to a method for switching data and a structure for switching data.

BACKGROUND

The variable-length switching technology is a packet switching technology that directly processes a variable-length packet in a structure for switching data instead of segmenting the variable-length packet into cells for transmission. The variable-length switching technology is characterized in that on data channels in the structure for switching data, when an input port begins to switch a packet to an output port, a data channel from the input port to the output port is connected and is not released until the whole variable-length packet is transferred to the output port. To improve the efficiency of variable-length switching and overcome the defects brought about by packet segmentation and reassembly, generally, the packet is not really physically segmented when the variable-length packet arrives at the input port. Instead, the packet is logically segmented into fixed-length cells and the fixed-length cells are transmitted back to back. In this way, the packet remains complete during the transmission and when being received upon arriving at the output port, thereby avoiding the operation of reassembling the cells.

The implementation of the variable-length switching technology requires a reasonable structure for switching data and a reasonable method for switching data. Common structures for switching data in the prior art are listed below.

I. Arbiter Crossbar (ArbiterXB) Switch Structure (a Buffered Arbiter Crossbar Switch Structure)

FIG. 1 shows an N×N switch structure in which both the number of input ports and the number of output ports are N. The ArbiterXB adopts a space division structure and uses a centralized arbiter to determine a connection state of each cross-point and determine an output port data channel to which each input port data channel in an switched fabric should be connected, so as to implement the function of transferring data from an ingress of the switched fabric to an egress of the switched fabric. The problem of the architecture lies in that, the switch capacity is limited by, the complexity of the centralized arbiter. The centralized arbitration needs to determine the connection state of each cross-point according to sending requests of all the input ports and sending states of all the output ports, and the computational complexity is in direct proportion to the square of the number of the ports. When a huge number of ports need to be supported, such a centralized arbiter is hard to implement.

II. Combined Input and Crossbar Queued (CICQ) Switch Structure (Also Referred to as a Buffered Crossbar Switch Structure)

FIG. 2 shows an N×N switch structure in which both the number of input ports and the number of output ports are N. The CICQ switch structure (buffered crossbar) has one First-In-First-Out (FIFO) buffer at each cross-point. In total $N^2$ (a square of N, where N is a natural number greater than or equal to 2, the same below) FIFOs exist. A centralized arbiter is not required, and each output port uses a simple output port scheduler to schedule N FIFO output port buffers. Each FIFO output port buffer sends back pressure information to a corresponding input port according to a queue depth, and each input port may decide whether to send data to the FIFO output port buffer according to the back pressure information.

The problem of the structure for switching data lies in that, although the defect of the centralized arbiter is overcome, in total $N^2$ buffers are required for implementing the N×N switch structure since each cross-point of the CICQ has one buffer. In case of a large number of input ports and output ports, the demands for on-chip Random Access Memory (RAM) capacity resources increase sharply, so that the implementation cost is too high.

III. Switch Structure Combining Advantages of CICQ and Arbiter XB

FIG. 3 shows an N×N switch structure in which both the number of input ports and the number of output ports are N. Each vertical column (corresponding to one output port data channel) of the CICQ has N cross-point buffers in total, which are replaced by k FIFO buffers having a fixed number irrelevant to the number of the input ports (k is a natural number greater than or equal to 1). The k FIFO buffers are dynamically shared by N cross-points. Generally, k=4.

The structure, similar to ArbiterXB, uses a centralized arbiter to process a scheduling request of each line card. The arbitration algorithm of the structure is simpler than that of the conventional ArbiterXB. Each output port of the conventional ArbiterXB only can receive data of one input port each time, an average pass rate of one time of iteration is only about 60%, and 3-4 times of iteration are required to achieve a high pass rate. In the new structure, each output port can receive data of k input ports at the same time, and it can be calculated that the pass rate of one time of iteration is as high as 99.7% when k=4.

Meanwhile, since each output port can receive data of k input ports at the same time, the probability of collision and conflict between the input ports is greatly reduced, so the input ports do not need to keep strict synchronization in reception with each other to reduce the conflict probability. In this way, variable-length switching can be implemented easily.

Although the structure saves buffer resources, the centralized arbiter is still used, and the improvement of the performance of variable-length switching is still limited to a certain degree.

In view of the above, the problem of the existing structures for switching data lies in the difficulty of improving the performance of variable-length switching while saving buffer resources.

SUMMARY

The objective of embodiments of the present invention is to provide a method for switching data and a structure for switching data for improving the performance of variable-length switching while saving buffer resources in the structure for switching data.

To solve the above technical problem, an embodiment of the present invention provides a method for switching data based on a structure for switching data, where the structure for switching data includes input ports, output ports, and a switch chip. The input ports and the output ports are respectively connected to the switch chip. The input ports include Fabric Interface Controllers (FICs). The output ports include output port schedulers. The output port schedulers correspond to the output ports. The switch chip includes input port data channels and output port data channels. The input port data channels and the output port data channels are vertically and horizontally connected through cross-points. The input port data channels correspond to the input ports one by one. The output port data channels correspond to the output ports. The switch chip further includes output port buffers. The output port buffers correspond to the output ports. The output port scheduler performs data scheduling for the output port buffers corresponding to the output port. The method for switching data includes:

obtaining, by the output port scheduler, state information of Empty or Non-empty of Virtual Output Queues (VOQs) of the input ports, available state information of Busy or Ready of the input port data channels, and available state information of Busy or Ready of the output port buffers;

if non-empty VOQs pointing to the output port exist in the input ports, meanwhile, input port data channels corresponding to the input ports are ready, and a ready output port buffer exists in the output port buffers corresponding to the output port, selecting, by the output port scheduler, one of the input ports and sending scheduling request information to the FIC of the input port, in which the scheduling request information includes scheduling the non-empty VOQ into the ready output port buffer;

after receiving the scheduling request information sent by the output port schedulers, selecting to respond, by the FIC of the selected input port, to a scheduling request of one output port scheduler and sending the VOQ pointing to the output port in the selected input port to the output port buffer;

if the scheduling request information is not selected by the FIC of the selected input port, continuing to send, by the output port scheduler, the scheduling request information to the FIC of another input port whose input port data channel is ready in the input ports corresponding to the non-empty VOQs pointing to the output port; and scheduling, by the output port scheduler, the VOQ received by the output port buffer out of the switch chip.

The present invention further provides a structure for switching data, which includes input ports, output ports, and a switch chip. The input ports and the output ports are respectively connected to the switch chip. The input ports include FICs. The output ports include output port schedulers. The output port schedulers correspond to the output ports. The switch chip includes input port data channels and output port data channels. The input port data channels and the output port data channels are vertically and horizontally connected through cross-points. The input port data channels correspond to the input ports one by one. The output port data channels correspond to the output ports. The switch chip further includes output port buffers. The output port buffers correspond to the output ports. The output port scheduler performs data scheduling for the output port buffers corresponding to the output port.

The output port scheduler is configured to obtain state information of Empty or Non-empty of VOQs of the input ports, available state information of Busy or Ready of the input port data channels, and available state information of Busy or Ready of the output port buffers.

The output port scheduler is further configured to, if non-empty VOQs pointing to the output port exist in the input ports, meanwhile, input port data channels corresponding to the input ports are ready, and a ready output port buffer exists in the output port buffers corresponding to the output port, select one of the input ports and send scheduling request information to the FIC of the input port, in which the scheduling request information includes scheduling the non-empty VOQ into the ready output port buffer.

The FIC of the selected input port is configured to receive the scheduling request information sent by the output port schedulers, select to respond to a scheduling request of one output port scheduler, and send the VOQ pointing to the output port in the selected input port to the output port buffer.

The output port scheduler is further configured to, if the scheduling request information is not selected by the FIC of the selected input port, continue to send the scheduling request information to the FIC of another input port whose input port data channel is ready in the input ports corresponding to the non-empty VOQs pointing to the output port.

The output port scheduler is further configured to schedule the VOQ received by the output port buffer out of the switch chip.

In the method for switching data and the structure for switching data provided in the embodiments, the centralized arbitration in the prior art is replaced by distributed scheduling of the output port schedulers, which improves the switching performance while saving buffer resources.

DETAILED DESCRIPTION

Embodiments of the present invention are described in detail below with reference to the accompanying drawings.

Embodiment 1

Figure 1:
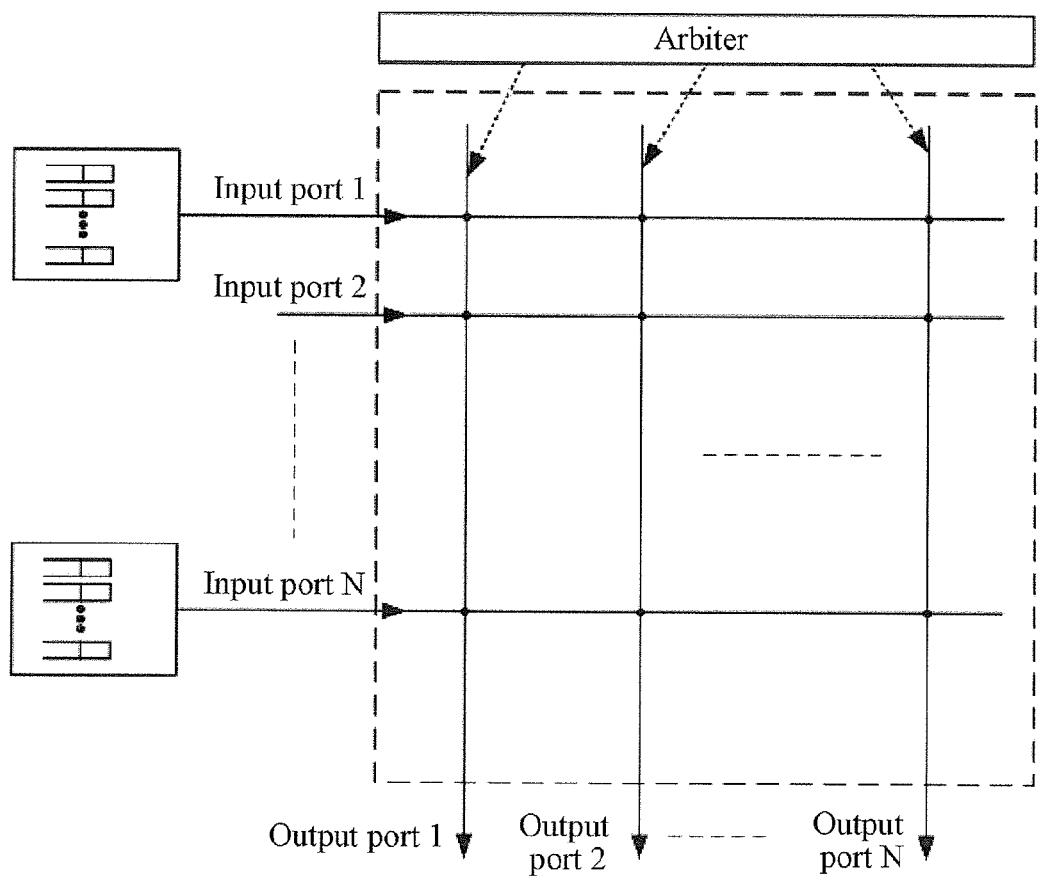
FIG. 1 is a schematic diagram of an Arbiter Crossbar switch structure in the prior art.
Figure 2:
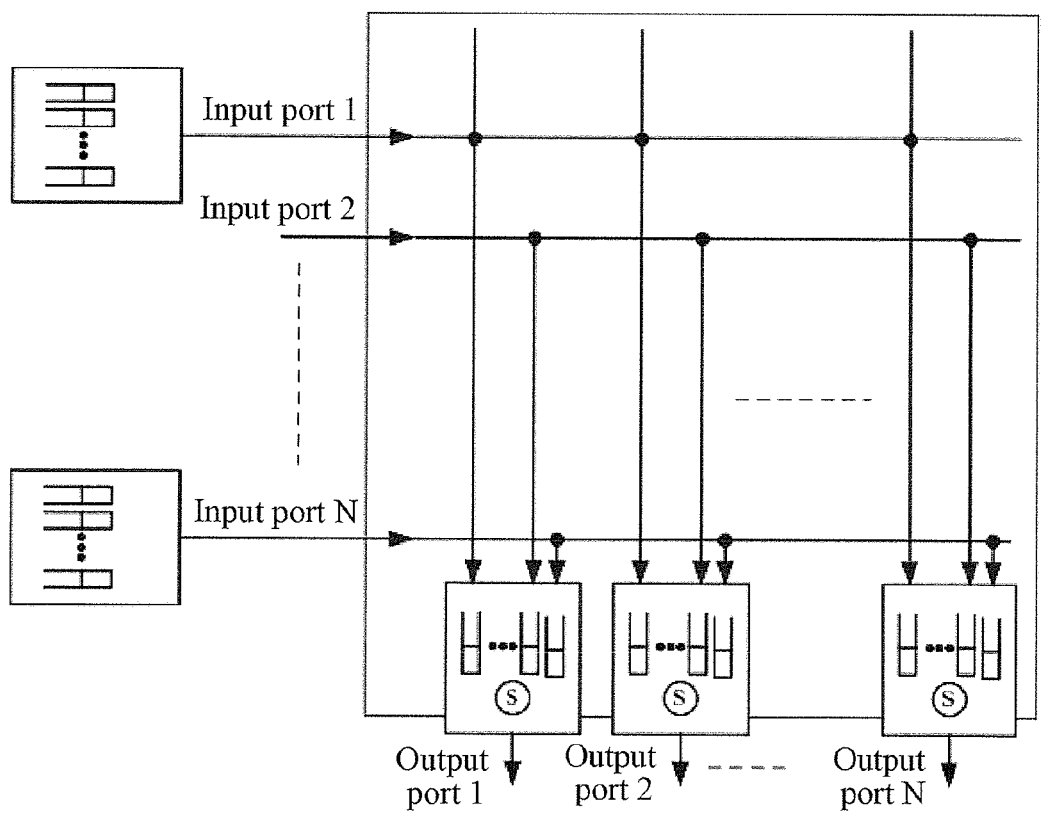
FIG. 2 is a schematic diagram of a CICQ switch structure in the prior art.
Figure 3:
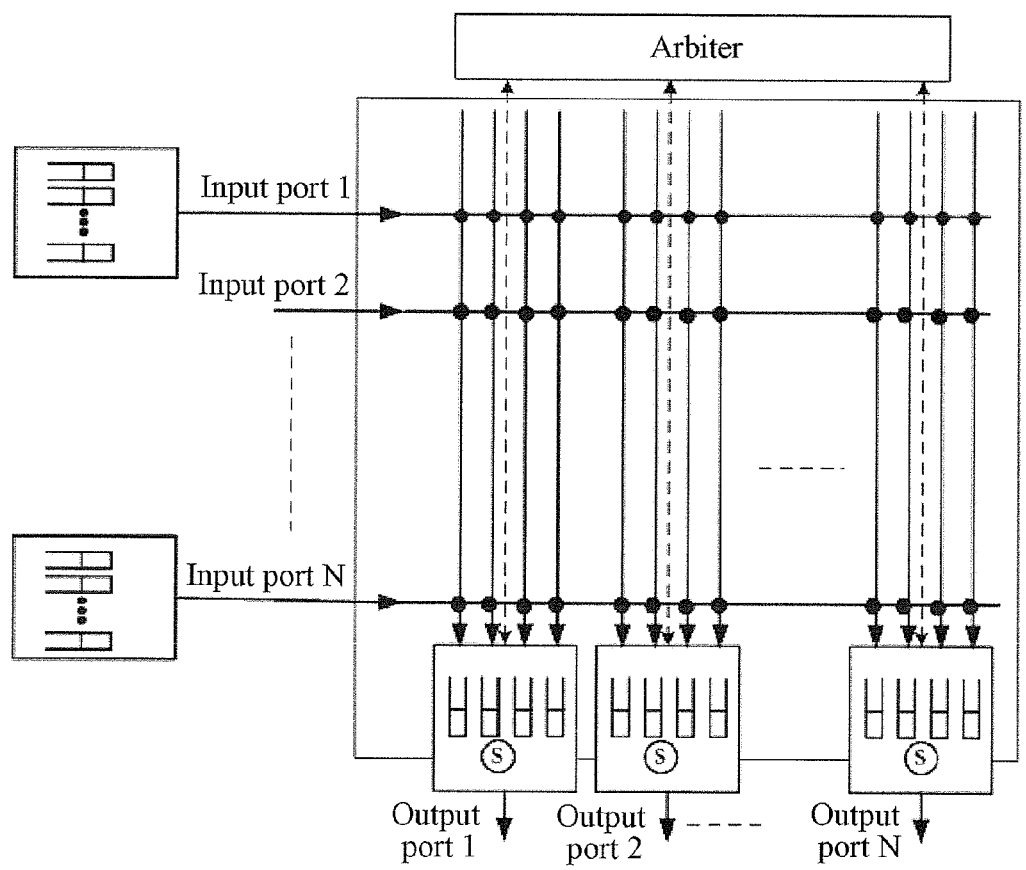
FIG. 3 is a schematic diagram of a switch structure in the prior art which combines advantages of CICQ and Arbiter XB.
Figure 4:
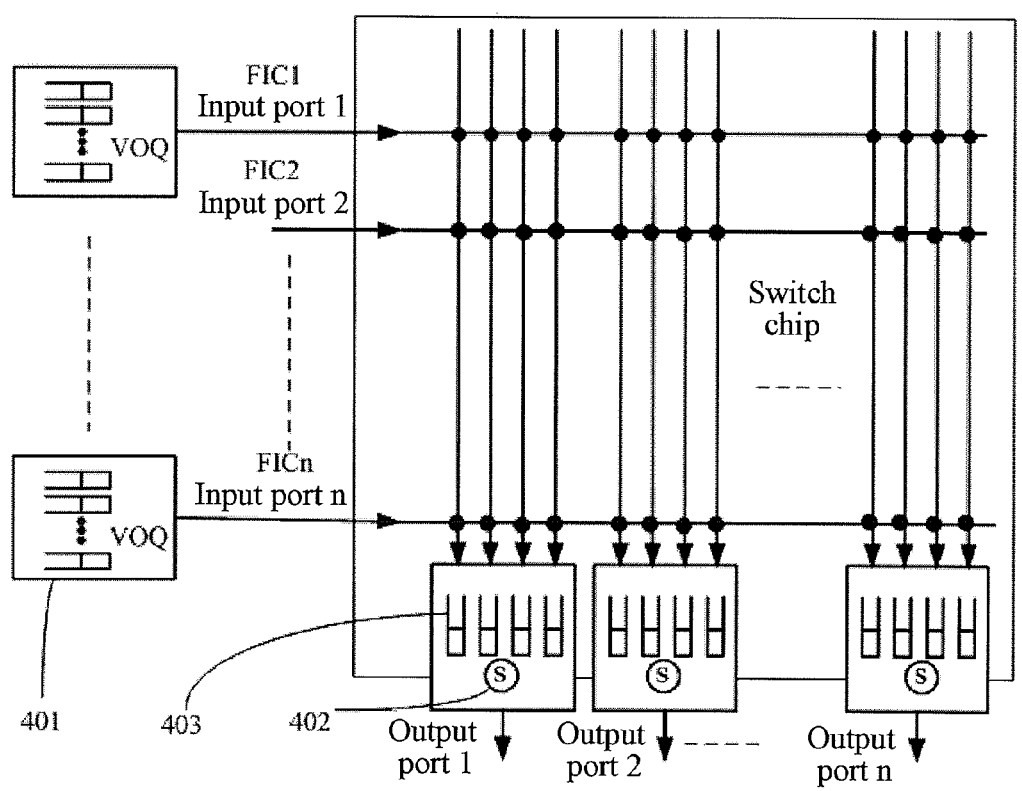
FIG. 4 is a schematic diagram of a structure for switching data according to Embodiment 1 of the present invention.

As shown in FIG. 4, a structure for switching data is provided in this embodiment. The structure for switching data includes input ports, output ports, and a switch chip. The input ports and the output ports are respectively connected to the switch chip. Each input port includes an FIC. That is, the input port 1 to the input port n respectively correspond to an FIC 1 to an FIC n. Each input port includes a buffer 401 configured to store VOQs. Each output port includes an output port scheduler 402, and the output port schedulers correspond to the output ports. The switch chip is connected to the output port schedulers 402 and the output port schedulers 402 may also be integrated on the switch chip. The switch chip includes input port data channels and output port data channels. The input port data channels and the output port data channels are vertically and horizontally connected through cross-points. The input port data channels correspond to the input ports one by one. The output port data channels correspond to the output ports. The switch chip further includes output port buffers 403, which may be FIFO output port buffers here and the output port buffers may be placed at the output port buffers respectively. To convert the arbitration scheduling of data switch into on-chip processing to achieve higher integration of the chip, the FIFO output port buffers are placed in the switch chip in this embodiment. Each output port corresponds to N FIFO output port buffers, where N is a natural number greater than or equal to 1, and exemplarily, the value of N is 4 in this embodiment. Each output port scheduler schedules 4 FIFO output port buffers of the output port where the output port scheduler resides. In FIG. 4, the input port data channels are represented by horizontal lines, and the output port data channels are represented by vertical lines. For each input port, one horizontal line is used to represent the input port data channel thereof. For each output port, 4 vertical lines are used to represent the output port data channels thereof, which respectively correspond to 4 FIFO output port buffers. That is, each output port data channel corresponds to one FIFO output port buffer. The structure for switching data is an n×n structure, that is, both the number of the input ports and the number of the output ports are n. In a conventional CICQ switch structure, each output port data channel has n crosspoint buffers in total. In total, $n^2$ buffers are required in case of an n×n structure similar to that of this embodiment. In this embodiment, each output port data channel has only 4 FIFO output port buffers. In this way, when the switch structure is an n×n structure, the number of the buffers is only 4n.

The output port scheduler is configured to obtain state information of Empty or Non-empty of VOQs of the input ports, available state information of Busy or Ready of the input port data channels, and available state information of Busy or Ready of the output port buffers.

The output port scheduler is further configured to, if non-empty VOQs pointing to the output port exist in the input ports, meanwhile, input port data channels corresponding to the input ports are ready, and a ready output port buffer exists in the output port buffers corresponding to the output port, select one of the input ports and send scheduling request information to the FIC of the input port, in which the scheduling request information includes scheduling the non-empty VOQ into the ready output port buffer.

The FIC of the selected input port is configured to receive the scheduling request information sent by the output port schedulers, select to respond to a scheduling request of one output port scheduler, and send the VOQ pointing to the output port in the selected input port to the output port buffer.

The output port scheduler is further configured to, if the scheduling request information is not selected by the FIC of the selected input port, continue to send the scheduling request information to the FIC of another input port whose input port data channel is ready in the input ports corresponding to the non-empty VOQs pointing to the output port.

The output port scheduler is further configured to schedule the VOQ received by the output port buffer out of the switch chip.

Compared with the prior art, the structure can save buffer resources and can be used for large-scale variable-length switching with a huge number of ports to break the bottleneck in switching performance of centralized arbitration.

Figure 5:
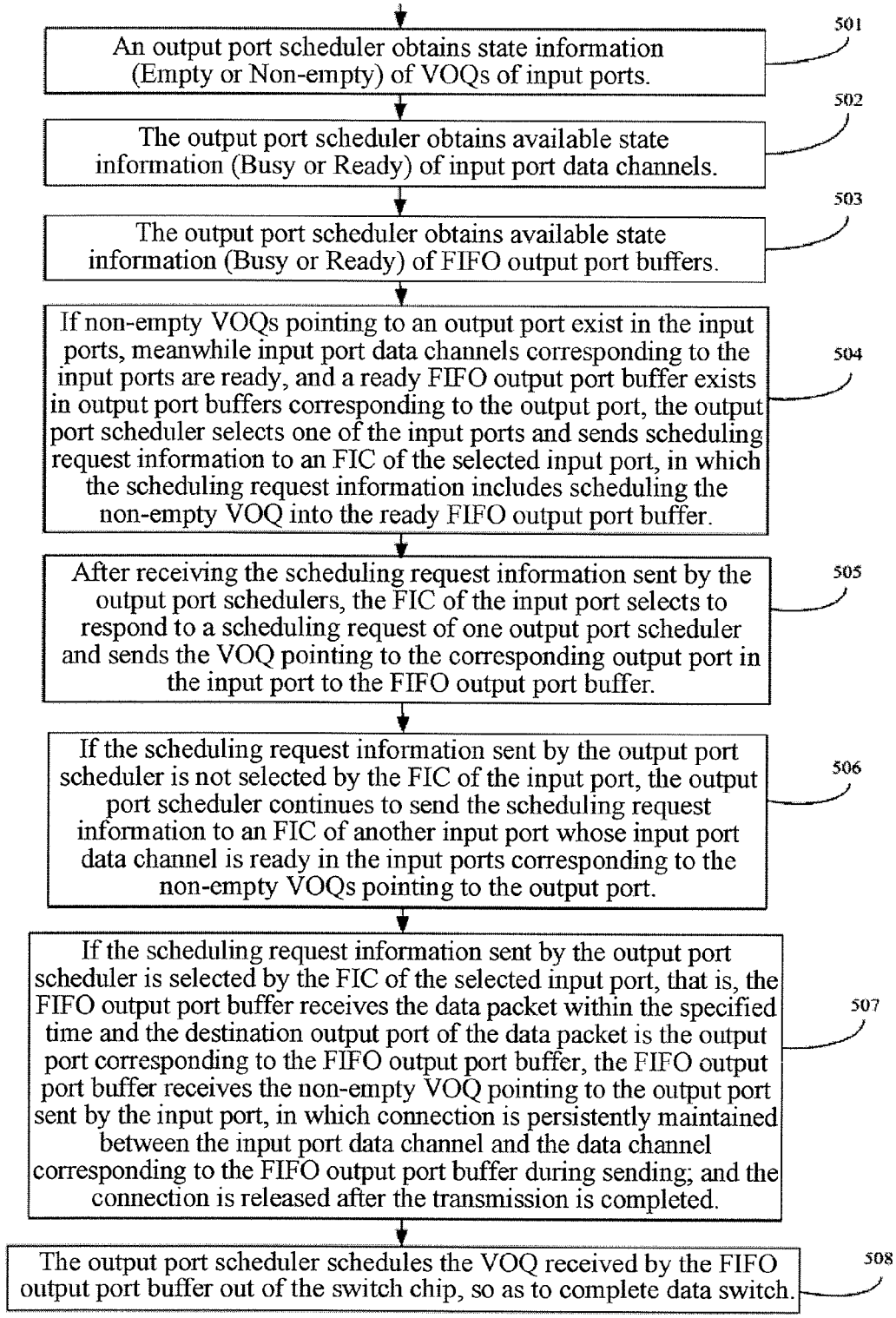
FIG. 5 is a schematic flow chart of a method for switching data according to Embodiment 1 of the present invention.

An application scenario of a method for switching data provided in this embodiment is based on the structure for switching data shown in FIG. 4. As shown in FIG. 5, the method for switching data provided in this embodiment includes the following steps.

Step 501: An output port scheduler obtains state information (Empty or Non-empty) of VOQs of input ports.

In step 501, the input ports adopt a VOQ technique. Queues pointing to the same output port in each input port are arranged into one virtual queue. The state of the VOQ pointing to the corresponding output port in each input port may be represented by 1 bit, and for n (n is a natural number greater than or equal to 1) output ports, n bits exist. That is, a state information table of the VOQs may be maintained by n bits.

In step 501, an FIC of an input port may send state information (Empty or Non-empty) of a VOQ to the output port scheduler. The output port scheduler receives the state information of the VOQs and updates a state information table of the VOQs in real time. If an input port has no variable-length packet pointing to an output port, state information of a VOQ pointing to the output port in the input port is Empty. On the contrary, if an input port has a variable-length packet pointing to an output port, state information of a VOQ pointing to the output port in the input port is Non-empty.

Step 502: The output port scheduler obtains available state information (Busy or Ready) of input port data channels.

In step 502, a specific method for determining the available state of the input port data channels is as follows.

1. A header of each data packet sent by the FIC of the input port to a switch chip carries length information of the data packet. If the header of the data packet appears on the input port data channel, the input port data channel is set to Busy.

2. A counter is set on each input port data channel to count the number of bytes currently transmitted of the data packet. If a difference between the length of the data packet and the number of the transmitted bytes is smaller than a preset value, the input port data channel is marked as Ready. The preset value is set according to an interaction time of the FIC of the input port and the output port scheduler. For example, the preset value is set to the number of bytes of the data packet that are possibly transmitted in an interaction time unit.

Step 503: The output port scheduler obtains available state information (Busy or Ready) of FIFO output port buffers.

In step 503, a specific method for determining the available state of the FIFO output port buffers is as follows.

1. If the FIFO output port buffer sends the scheduling request information through the corresponding output port scheduler, the available state information of the FIFO output port buffer is set to Busy.

2. If the following conditions are met, the available state information of the FIFO output port buffer is set to Ready.

A next data packet of an input port data channel connected to an output port data channel corresponding to the FIFO output port buffer is not destined for the current FIFO output port buffer; or the next data packet of the input port data channel is destined for the current FIFO output port buffer and the transmission of the data packet ends; and the FIFO output port buffer is not full.

Each output port scheduler respectively schedules 4 FIFO output port buffers, which correspond to 4 output port data channels, so 4 bits can be used to mark the available state of the FIFO output port buffers.

Step 504: If non-empty VOQs pointing to an output port exist in the input ports, input port data channels corresponding to the input ports are ready, and a ready FIFO output port buffer exists in output port buffers corresponding to the output port, the output port scheduler selects one of the input ports and sends scheduling request information to an FIC of the selected input port, in which the scheduling request information includes scheduling the non-empty VOQ into the ready FIFO output port buffer.

In step 504, it is possible that multiple input ports have VOQs pointing to an output port and multiple input port data channels are ready. At this time, the output port scheduler selects one of the input ports for the FIFO output port buffer and sends scheduling request information to an FIC corresponding to the selected input port. The input port may be selected by using different methods. Exemplarily, a Weighted Round Robin (WRR) scheduling method is adopted in this embodiment, that is, round robin scheduling is performed according to weights of VOQs of different input ports, and an input port whose VOQ pointing to the output port has a large weight is preferentially selected for sending the scheduling request information to the FIC thereof. The weight may be set through multiple solutions, and exemplarily, the weight is set according to data traffic corresponding to the VOQ of the input port in this embodiment.

In step 504, the output port scheduler may select multiple ready FIFO output port buffers at the same time, and send scheduling request information to an FIC of a port whose input port data channel is ready in the input ports corresponding to the non-empty VOQs pointing to the output port corresponding to the output port scheduler. Alternatively, 4 time slices may be assigned to 4 FIFO output port buffers scheduled by each output port scheduler, and each time slice serves one FIFO output port buffer.

Step 505: After receiving the scheduling request information sent by the output port schedulers, the FIC of the selected input port selects to respond to a scheduling request of one output port scheduler and sends the VOQ pointing to the corresponding output port in the selected input port to the FIFO output port buffer.

In step 505, the FIC of the selected input port may select the scheduling request information sent from different output port schedulers by using multiple different methods. Exemplarily, a simple Round Robin (RR) scheduling method is adopted in this embodiment. For example, the FIC of the selected input port numbers and sequences each output port scheduler sending the scheduling request, assigns time slices uniformly, and responds to the scheduling request information of the output port schedulers in the sequence of the serial numbers. If multiple output port schedulers send the scheduling request information to one FIC at the same time, the scheduling request information may be combined and then sent to the FIC of the selected input port.

Step 506: If the scheduling request information sent by the output port scheduler is not selected by the FIC of the selected input port, the output port scheduler continues to send the scheduling request information to an FIC of another input port whose input port data channel is ready in the input ports corresponding to the non-empty VOQs pointing to the output port.

In step 506, the condition that the scheduling request information is not selected by the FIC of the selected input port includes:

(1) the FIFO output port buffer does not receive any data packet within a specified time; or (2) the FIFO output port buffer receives a data packet within a specified time, but a destination FIFO output port buffer of the data packet is not the FIFO output port buffer.

If the aforementioned condition (1) or (2) is met, the FIFO output port buffer is released, and the available state information of the FIFO output port buffer is set to Ready.

Step 507: If the scheduling request information sent by the output port scheduler is selected by the FIC of the selected input port, that is, the FIFO output port buffer receives the data packet within the specified time and the destination output port of the data packet is the output port corresponding to the FIFO output port buffer, the FIFO output port buffer receives the non-empty VOQ pointing to the output port sent by the input port. Connection is persistently maintained between the input port data channel and the data channel corresponding to the FIFO output port buffer during sending; and the connection is released after the transmission is completed.

A rule for releasing the connection in step 507 is specifically as follows.

The output port scheduler keeps checking information of a header of a data packet sent from the input port data channel, and the connection is released in either of the following two cases.

1. A next data packet of the input port data channel connected to the output port data channel corresponding to the FIFO output port buffer is not destined for the FIFO output port buffer.

2. The next data packet of the input port data channel connected to the output port data channel corresponding to the FIFO output port buffer is destined for the FIFO output port buffer, and the transmission of the data packet ends.

In steps 506 and 507, the specified time is a timeout count value, and the specific value thereof may be set according to a response time of the FIC of the input port to the scheduling request information of the output port scheduler. The specific time may also be used to sense a fault in time. For example, an output port buffer has selected an input port, but the FIC corresponding to the input port fails, for example, the FIC of the input port is pulled out and the data packet is unable to be sent, the input port buffer may automatically abandon the scheduling request for the input port and select another input port whose input port data channel is ready after waiting for a time exceeding the specified time.

Step 508: The output port scheduler schedules the VOQ received by the FIFO output port buffer out of the switch chip, so as to complete data switch.

Steps 501, 502, and 503 are performed without any precedence order, as long as they are performed before step 504.

Embodiment 2

An application scenario of a method for switching data provided in this embodiment is based on the structure for switching data shown in FIG. 4. The structure for switching data includes input ports, output ports, and a switch chip. The input ports and the output ports are respectively connected to the switch chip. Each input port includes an FIC, that is, the input port 1 to the input port n respectively correspond to an FIC 1 to an FIC n. Each input port includes a buffer 401 configured to store VOQs. Each output port includes an output port scheduler 402. The output port schedulers correspond to the output ports. The switch chip is connected to the output port schedulers 402 and the output port schedulers 402 may also be integrated on the switch chip. The switch chip includes input port data channels and output port data channels. The input port data channels and the output port data channels are vertically and horizontally connected through cross-points. The input port data channels correspond to the input ports one by one. The output port data channels correspond to the output ports. The switch chip further includes output port buffers 403, which may be FIFO output port buffers here, and the output port buffers may be placed at the output ports respectively. To convert the arbitration scheduling of data switch into on-chip processing to achieve higher integration of the chip, the FIFO output port buffers are placed in the switch chip in this embodiment. Each output port corresponds to N FIFO output port buffers, where N is a natural number greater than or equal to 1, and exemplarily, the value of N is 4 in this embodiment. Each output port scheduler schedules 4 FIFO output port buffers of the output port where the output port scheduler resides. In FIG. 4, the input port data channels are represented by horizontal lines, and the output port data channels are represented by vertical lines. For one input port, one horizontal line is used to represent the input port data channel thereof. For one output port, 4 vertical lines are used to represent the output port data channels thereof, which respectively correspond to 4 FIFO output port buffers, that is, each output port data channel corresponds to one FIFO output port buffer. The structure for switching data is an n×n structure, that is, both the number of the input ports and the number of the output ports are n. In a conventional CICQ switch structure, each output port data channel has n crosspoint buffers in total, and in total $n^2$ buffers are required in case of an n×n structure similar to that of this embodiment. In this embodiment, each output port data channel has only 4 FIFO output port buffers. In this way, when the switch structure is an n×n structure, the number of the buffers is only 4n.

Compared with the prior art, the structure can save buffer resources and can be used for large-scale variable-length switching through the method for switching data provided in this embodiment to break the bottleneck in switching performance of centralized arbitration.

Figure 6:
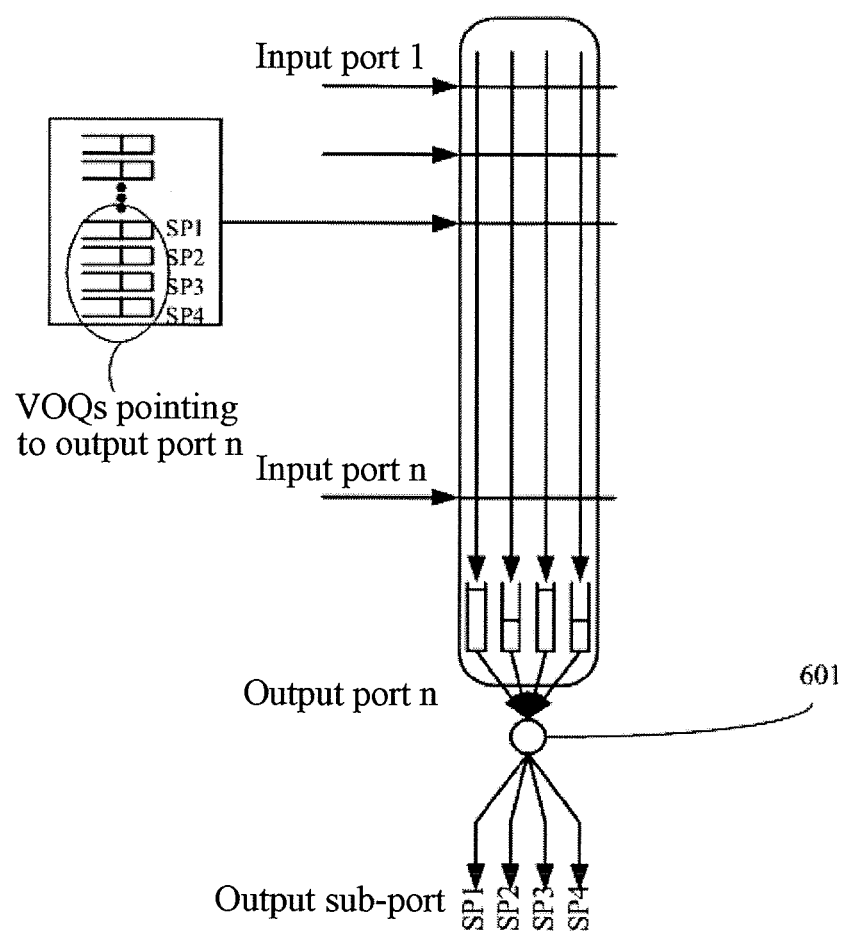
FIG. 6 is a schematic diagram of an application scenario of a method for switching data according to Embodiment 2 of the present invention.

As shown in FIG. 6, in this embodiment, output sub-ports exist at each output port and may be scheduled. Exemplarily, 4 output sub-ports SP1, SP2, SP3, and SP4 exist at each output port in this embodiment. An output port scheduler n corresponding to the output port n maintains leaky bucket counters of the 4 output sub-ports, for respectively calculating the sent traffic of the 4 output sub-ports.

Figure 7:
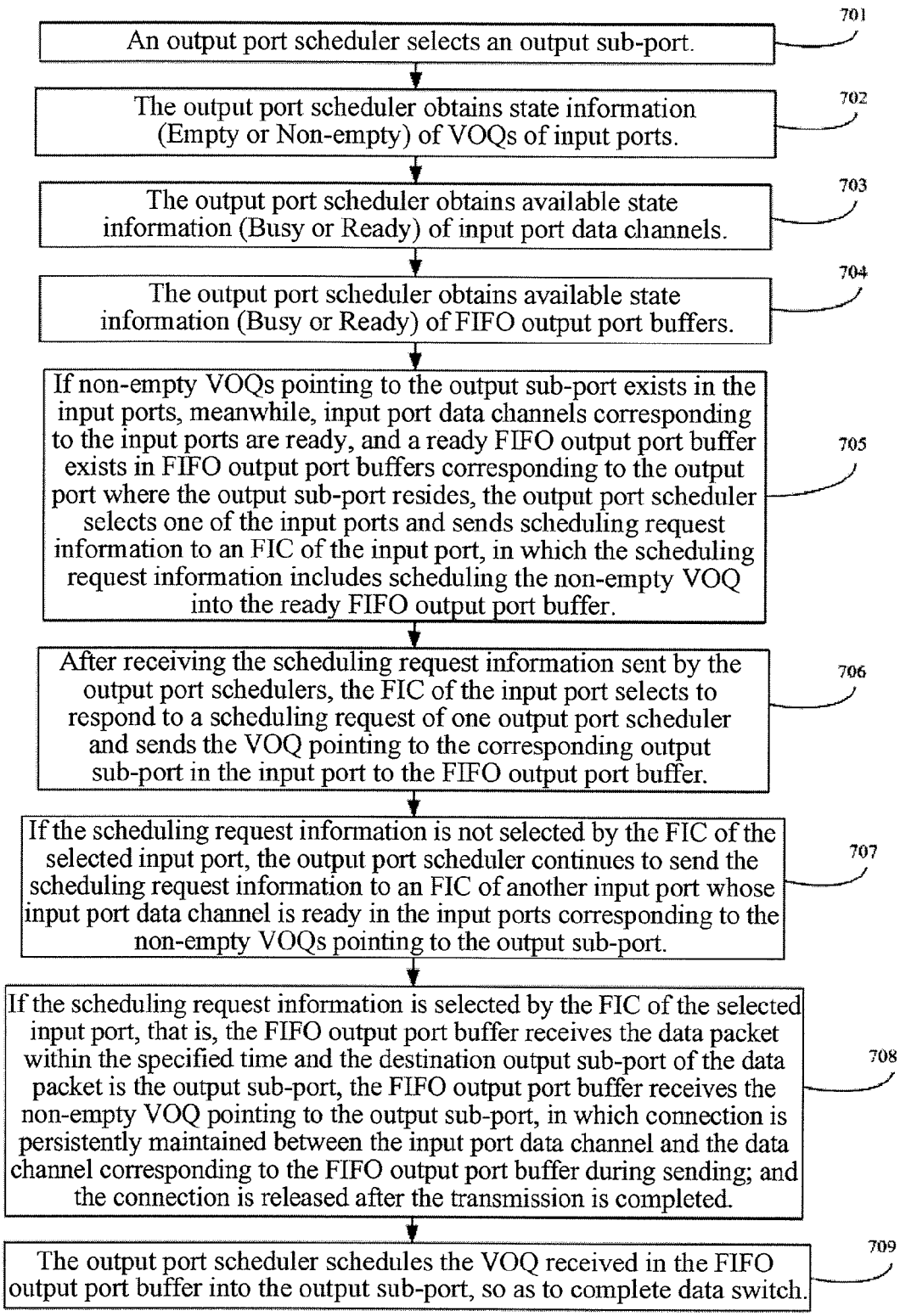
FIG. 7 is a schematic flow chart of a method for switching data according to Embodiment 2 of the present invention.

As shown in FIG. 7, a method for switching data provided in this embodiment includes the following steps.

Step 701: An output port scheduler selects an output sub-port.

In step 701, if a leaky bucket counter of the output sub-port overflows, the output sub-port does not participate in scheduling. The output port scheduler may select the output sub-port by using multiple methods, exemplarily, a WRR scheduling method. The weight may be set through multiple solutions, and exemplarily, the weight is set according to data traffic corresponding to the output sub-port in this embodiment.

Step 702: The output port scheduler obtains state information (Empty or Non-empty) of VOQs of input ports.

In step 702, the input ports adopt a VOQ technique. Queues pointing to the same output sub-port in each input port are arranged into one virtual queue. The state of the VOQ pointing to the corresponding output sub-port in each input port may be represented by 1 bit, and for m (m is a natural number greater than or equal to 1) output sub-ports, m bits exist. That is, a state information table of the VOQs pointing to one output sub-port may be maintained by m bits. In case of n output ports (n is a natural number greater than or equal to 1) each having m output sub-ports, n×m bits are required to maintain the state information table of the VOQs.

In step 702, an FIC of an input port sends state information (Empty or Non-empty) of a VOQ pointing to the output sub-port to the output port scheduler. The output port scheduler receives the state information of the VOQs and updates a state information table of the VOQs in real time. If state information of a VOQ pointing to an output sub-port in an input port is Empty, it indicates that the input port has no variable-length packet pointing to the output sub-port. On the contrary, if state information of a VOQ pointing to an output sub-port in an input port is Non-empty, it indicates that the input port has a variable-length packet pointing to the output sub-port.

Step 703: The output port scheduler obtains available state information (Busy or Ready) of input port data channels.

In step 703, a specific method for determining the available state of the input port data channels is as follows.

1. A header of each data packet sent by the FIC of the input port to a switch chip carries length information of the data packet. If the header of the data packet appears on the input port data channel, the input port data channel is set to Busy.

2. A counter is set on each input port data channel to count the number of bytes currently transmitted of the data packet. If a difference between the length of the data packet and the number of the transmitted bytes is smaller than a preset value, the input port data channel is set to Ready. The preset value is set according to an interaction time of the FIC of the input port and the output port scheduler, namely, the preset value is the number of bytes of the data packet that are possibly transmitted in an interaction time unit.

Step 704: The output port scheduler obtains available state information (Busy or Ready) of FIFO output port buffers.

In step 704, a specific method for determining the available state of the FIFO output port buffers is as follows.

1. If the FIFO output port buffer sends the scheduling request information through the corresponding output port scheduler, the FIFO output port buffer is set to Busy.

2. If the following conditions are met, the FIFO output port buffer is set to Ready.

a) A next data packet of an input port data channel connected to an output port data channel corresponding to the FIFO output port buffer is not destined for the current FIFO output port buffer; or the next data packet of the input port data channel is destined for the current FIFO output port buffer, and the transmission of the data packet ends.

b) The FIFO output port buffer is not full.

Each output port scheduler respectively schedules 4 FIFO output port buffers, which correspond to 4 output port data channels, so 4 bits can be used to mark the available state of the FIFO output port buffers.

Step 705: If non-empty VOQs pointing to the output sub-port exists in the input ports, meanwhile, input port data channels corresponding to the input ports are ready, and a ready FIFO output port buffer exists in FIFO output port buffers corresponding to the output port where the output sub-port resides, the output port scheduler selects one of the input ports and sends scheduling request information to an FIC of the input port, in which the scheduling request information includes scheduling the non-empty VOQ into the ready FIFO output port buffer.

In step 705, it is possible that multiple input ports have VOQs pointing to an output port and multiple input port data channels are ready. At this time, the output port scheduler may select an input port by using multiple different methods. Exemplarily, a WRR scheduling method is adopted in this embodiment, that is, round robin scheduling is performed according to weights of VOQs of different input ports, and an input port whose VOQ pointing to the output sub-port has a large weight is preferentially selected for sending the scheduling request information to the FIC thereof. The weight may be set through multiple solutions, and exemplarily, the weight is set according to data traffic corresponding to the input port in this embodiment.

Step 706: After receiving the scheduling request information sent by the output port schedulers, the FIC of the selected input port selects to respond to a scheduling request of one output port scheduler and sends the VOQ pointing to the corresponding output sub-port in the selected input port to the FIFO output port buffer.

In step 706, the FIC of the selected input port may select the scheduling request information sent from different output port schedulers by using multiple different methods. Exemplarily, a simple RR scheduling method is adopted in this embodiment. For example, the FIC of the selected input port numbers and sequences each output port scheduler sending the scheduling request, assigns time slices uniformly, and responds to the scheduling request information of the output port schedulers in the sequence of the serial numbers. If multiple output port schedulers send the scheduling request information to one FIC at the same time, the scheduling request information may be combined and then sent to the FIC of the selected input port.

Step 707: If the scheduling request information is not selected by the FIC of the selected input port, the output port scheduler continues to send the scheduling request information to an FIC of another input port whose input port data channel is ready in the input ports corresponding to the non-empty VOQs pointing to the output sub-port.

In step 707, the condition that the scheduling request information is not selected by the FIC of the selected input port includes:

(1) the FIFO output port buffer does not receive any data packet within a specified time; or (2) the FIFO output port buffer receives a data packet within a specified time, but a destination FIFO output port buffer of the data packet is not the FIFO output port buffer.

If the aforementioned condition (1) or (2) is met, the FIFO output port buffer is released, and the available state information of the FIFO output port buffer is set to Ready.

Step 708: If the scheduling request information is selected by the FIC of the selected input port, that is, the FIFO output port buffer receives the data packet within the specified time and the destination output sub-port of the data packet is the output sub-port, the FIFO output port buffer receives the non-empty VOQ pointing to the output sub-port. Connection is persistently maintained between the input port data channel and the data channel corresponding to the FIFO output port buffer during sending; and the connection is released after the transmission is completed.

A rule for releasing the connection in step 708 is specifically as follows.

The output port scheduler corresponding to the FIFO output port buffer keeps checking information of a header of a data packet sent from the input port data channel, and the connection is released in either of the following two cases.

1. A next data packet of the input port data channel connected to the data channel corresponding to the FIFO output port buffer is not destined for the FIFO output port buffer.

2. The next data packet of the input port data channel connected to the data channel corresponding to the FIFO output port buffer is destined for the FIFO output port buffer, and the transmission of the data packet ends.

In steps 707 and 708, the specified time is a timeout count, and the specific value thereof may be set according to a response time of the FIC of the input port to the scheduling request information sent by the output port scheduler. The specific time may also be used to prevent a fault. For example, an output port buffer has selected an input port, but the FIC corresponding to the input port fails, for example, the FIC of the selected input port is pulled out and the data packet is unable to be sent, the input port buffer should automatically abandon the scheduling request for the input port and select another input port whose input port data channel is ready after waiting a time exceeding the specified time.

Step 709: The output port scheduler schedules the VOQ received in the FIFO output port buffer into the output sub-port, so as to complete data switch.

In step 709, it is assumed that the output port scheduler selects an output sub-port and an input port data channel for service when serving an output port buffer. Then, when serving a next output port buffer, the output port scheduler may still select the output sub-port but does not need to select the input port data channel that has been selected. With such a solution, the efficiency of the switched fabric can be improved.

Steps 702, 703, and 704 are performed without any precedence order, as long as they are performed before step 705.

Through the introduction of the aforementioned two embodiments, it can be known that in the structure for switching data and the method for switching data provided in the embodiments of the present invention, the centralized arbiter in the conventional structure for switching data is omitted through distributed scheduling, so that the switching performance of the structure for switching data is improved while saving cross-point buffer resources.

Persons of ordinary skill in the art may understand that all or a part of the steps of the method according to the embodiments may be implemented by a program instructing relevant hardware. The program may be stored in a computer readable storage medium. When the program runs, the steps of the method according to the embodiments are performed. The storage medium may be any medium that is capable of storing program codes, such as a Read-Only Memory (ROM), a Random Access Memory (RAM), a magnetic disk, or an optical disk.

The foregoing descriptions are merely specific embodiments of the present invention, but are not intended to limit the protection scope of the present invention. Changes or replacements readily apparent to persons skilled in the prior art within the technical scope of the present invention should fall within the protection scope of the present invention. Therefore, the protection scope of the present invention is subject to the appended claims.

What is claimed is:

1. A method for switching data, based on a structure for switching data, wherein the structure for switching data comprises input ports, output ports, and a switch chip, and the input ports and the output ports are respectively connected to the switch chip; the input ports comprise Fabric Interface Controllers (FICs); the output ports comprise output port schedulers, and the output port schedulers correspond to the output ports; the switch chip comprises input port data channels and output port data channels, the input port data channels and the output port data channels are vertically and horizontally connected through cross-points, the input port data channels correspond to the input ports one by one, and the output port data channels correspond to the output ports; and the switch chip further comprises output port buffers, the output port buffers correspond to the output ports, and the output port scheduler performs data scheduling for the output port buffers corresponding to the output ports, and the method for switching data comprises:

obtaining, by the output port scheduler, state information of Empty or Non-empty of Virtual Output Queues (VOQs) of the input ports, available state information of Busy or Ready of the input port data channels, and available state information of Busy or Ready of the output port buffers;

if non-empty VOQs pointing to the output port exist in the input ports, meanwhile, input port data channels corresponding to the input ports are ready, and a ready output port buffer exists in the output port buffers corresponding to the output port, selecting, by the output port scheduler, one of the input ports and sending scheduling request information to the FIC of the input port, wherein the scheduling request information comprises scheduling the non-empty VOQ into the ready output port buffer;

after receiving the scheduling request information sent by the output port schedulers, selecting to respond, by the FIC of the selected input port, to a scheduling request of one output port scheduler and sending the VOQ pointing to the output port in the selected input port to the output port buffer;

if the scheduling request information is not selected by the FIC of the selected input port, the output port scheduler continues to send the scheduling request information to the FIC of another input port whose input port data channel is ready in the input ports corresponding to the non-empty VOQs pointing to the output port; and scheduling, by the output port scheduler, the VOQ received by the output port buffer out of the switch chip.

2. The method according to claim 1, wherein
the state information of Empty or Non-empty of the VOQs is sent by the FICs of the input ports to the output port scheduler.

3. The method according to claim 1, wherein an available state of the input port data channel comprises Busy and Ready, and the determining the available state of the input port data channel comprises:
(1) carrying in a header of each data packet sent by the FIC of the input port to the switch chip length information of the data packet, and if the header of the data packet appears on the input port data channel, setting the input port data channel to Busy; and
(2) setting a counter on the input port data channel to count the number of transmitted bytes of the data packet, and if a difference between the length of the data packet and the number of the transmitted bytes is smaller than a preset value, setting the input port data channel to Ready, wherein the preset value is set according to an interaction time of the FIC of the input port and the output port scheduler.

4. The method according to claim 1, wherein an available state of the output port buffer comprises Busy and Ready, and the determining the available state of the output port buffer comprises:
(1) if the output port buffer sends the scheduling request information through the output port scheduler, setting the output port buffer to Busy;
(2) if the following conditions are met, setting the output port buffer to Ready:
a next data packet of an input port data channel connected to an output port data channel corresponding to the output port buffer is not destined for the output port buffer; or
the next data packet of the input port data channel is destined for the output port buffer and the transmission of the data packet ends and the output port buffer is not full.

5. The method according to claim 1, wherein a condition that the scheduling request information is not selected by the FIC of the selected input port comprises:
(1) the output port buffer does not receive any data packet within a specified time; or
(2) the output port buffer receives a data packet within a specified time, but a destination output port buffer of the data packet is not the output port buffer, wherein the specified time is set according to a response time of the FIC of the selected input port to the scheduling request information of the output port buffer.

6. The method according to claim 1, further comprising: if the scheduling request information is selected by the FIC of the selected input port, receiving, by the output port buffer, the non-empty VOQ pointing to the output port; persistently maintaining connection between the input port data channel and the data channel corresponding to the output port buffer during sending; and releasing the connection after the transmission is completed.

7. The method according to claim 6, wherein the releasing the connection after the transmission is completed comprises:
keeping checking, by the output port scheduler, information of a header of a data packet sent from the input port data channel, and releasing the connection in either of the following two cases:
(1) a next data packet of an input port data channel connected to an output port data channel corresponding to the output port buffer is not destined for the output port buffer; and
(2) a next data packet of an input port data channel connected to an output port data channel corresponding to the output port buffer is destined for the output port buffer, and the transmission of the data packet ends.

8. The method according to claim 1, wherein the output port scheduler selects the input port whose input port data channel is ready in the input ports corresponding to the non-empty VOQs pointing to the output port by using a Weighted Round Robin (WRR) scheduling method.

9. The method according to claim 1, wherein the FIC of the selected input port selects the scheduling request information sent from different output port schedulers by using a simple Round Robin (RR) scheduling method.

10. The method according to claim 1, wherein the output ports of the structure for switching data comprises output sub-ports, and the method for switching data further comprises: scheduling, by the output port scheduler, the output sub-ports when scheduling the VOQ received in the output port buffer out of the switch chip.

11. The method according to claim 10, wherein the scheduling the output sub-ports comprises:
setting a leaky bucket counter for each output sub-port, and calculating, by the output port scheduler, sent traffic of the output sub-port respectively;
establishing VOQs pointing to the output sub-ports in the input ports, and for n input ports and m output sub-ports, using, by the output port scheduler, n*m bits to maintain state information of the VOQs, wherein m and n are natural numbers greater than or equal to 1;
selecting, by the output port scheduler, an output sub-port preferentially;
obtaining, by the output port scheduler, state information of Empty or Non-empty of the VOQs of the input ports, available state information of Busy or Ready of the input port data channels, and available state information of Busy or Ready of the output port buffers;
if non-empty VOQs pointing to the output sub-port exist in the input ports, meanwhile, input port data channels corresponding to the input ports are ready, and a ready output port buffer exists in the output port buffers corresponding to the output port where the output sub-port resides, selecting, by the output port scheduler, one of the input ports and sending scheduling request information to the FIC of the input port, wherein the scheduling request information comprises scheduling the non-empty VOQ into the ready output port buffer;

after receiving the scheduling request information sent by the output port schedulers, selecting to respond, by the FIC of the selected input port, to a scheduling request of one output port scheduler and sending the VOQ pointing to the output port in the selected input port to the output port buffer;

if the scheduling request information is not selected by the FIC of the selected input port, continuing to send, by the output port scheduler, the scheduling request information to the FIC of another input port whose input port data channel is ready in the input ports corresponding to the non-empty VOQs pointing to the output sub-port; and scheduling, by the output port scheduler, the VOQ received by the output port buffer into the output sub-port.

12. The method according to claim 11, wherein the selecting, by the output port scheduler, an output sub-port preferentially comprises: selecting the output sub-port by using a WRR scheduling method.

13. A structure for switching data, comprising input ports, output ports, and a switch chip, wherein the input ports and the output ports are respectively connected to the switch chip; the input ports comprise Fabric Interface Controllers (FICs); the output ports comprise output port schedulers, and the output port schedulers correspond to the output ports; the switch chip comprises input port data channels and output port data channels, the input port data channels and the output port data channels are vertically and horizontally connected through cross-points, the input port data channels correspond to the input ports one by one, and the output port data channels correspond to the output ports; and the switch chip further comprises output port buffers, the output port buffers correspond to the output ports, and the output port scheduler performs data scheduling for the output port buffers corresponding to the output ports wherein the output port scheduler is configured to obtain state information of Empty or Non-empty of VOQs of the input ports, available state information of Busy or Ready of the input port data channels, and available state information of Busy or Ready of the output port buffers;

the output port scheduler is further configured to, if non-empty VOQs pointing to the output port exist in the input ports, meanwhile, input port data channels corresponding to the input ports are ready, and a ready output port buffer exists in output port buffers corresponding to the output port, select one of the input ports and send scheduling request information to the FIC of the input port, wherein the scheduling request information comprises scheduling the non-empty VOQ into the ready output port buffer;

the FIC of the selected input port is configured to receive the scheduling request information sent by the output port schedulers, select to respond to a scheduling request of one output port scheduler, and send the VOQ pointing to the output port in the selected input port to the output port buffer; the output port scheduler is further configured to, if the scheduling request information is not selected by the FIC of the selected input port, continue to send the scheduling request information to the FIC of another input port whose input port data channel is ready in the input ports corresponding to the non-empty VOQs pointing to the output port; and the output port scheduler is further configured to schedule the VOQ received by the output port buffer out of the switch chip.

14. The structure for switching data according to claim 13, wherein the output ports comprises output sub-ports, and the output port scheduler is further configured to schedule the output sub-ports when scheduling the VOQ received in the output port buffer out of the switch chip.

15. A method for switching data, based on a structure for switching data, wherein the structure for switching data comprises input ports, output ports comprising output sub-ports, and a switch chip, and the input ports and the output ports are respectively connected to the switch chip; the input ports comprise Fabric Interface Controllers (FICs); the output ports comprise output port schedulers, and the output port schedulers correspond to the output ports; the switch chip comprises input port data channels and output port data channels, the input port data channels and the output port data channels are vertically and horizontally connected through cross-points, the input port data channels correspond to the input ports one by one, and the output port data channels correspond to the output ports; and the switch chip further comprises output port buffers, the output port buffers correspond to the output ports, and the output port scheduler performs data scheduling for the output port buffers corresponding to the output ports, and the method for switching data comprises:

obtaining, by the output port scheduler, state information of Empty or Non-empty of Virtual Output Queues (VOQs) of the input ports, available state information of Busy or Ready of the input port data channels, and available state information of Busy or Ready of the output port buffers;

if non-empty VOQs pointing to the output port exist in the input ports, meanwhile, input port data channels corresponding to the input ports are ready, and a ready output port buffer exists in the output port buffers corresponding to the output port, selecting, by the output port scheduler, one of the input ports and sending scheduling request information to the FIC of the input port, wherein the scheduling request information comprises scheduling the non-empty VOQ into the ready output port buffer;

after receiving the scheduling request information sent by the output port schedulers, selecting to respond, by the FIC of the selected input port, to a scheduling request of one output port scheduler and sending the VOQ pointing to the output port in the selected input port to the output port buffer;

if the scheduling request information is not selected by the FIC of the selected input port, the output port scheduler continues to send the scheduling request information to the FIC of another input port whose input port data channel is ready in the input ports corresponding to the non-empty VOQs pointing to the output port;

scheduling, by the output port scheduler, the VOQ received by the output port buffer out of the switch chip; and scheduling, by the output port scheduler, the output sub-ports when scheduling the VOQ received in the output port buffer out of the switch chip.

* * * * *